United States Patent
Oteyza

(10) Patent No.: US 10,020,929 B1
(45) Date of Patent: Jul. 10, 2018

(54) METHODS AND SYSTEMS FOR DATA ALIGNMENT IN NETWORK DEVICES

(71) Applicant: Cavium, Inc., Aliso Viejo, CA (US)

(72) Inventor: Raul Oteyza, Yorba Linda, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 15/670,841

(22) Filed: Aug. 7, 2017

(51) Int. Cl.
*H04L 7/00* (2006.01)
*G06F 9/38* (2018.01)
*G06F 13/42* (2006.01)
*H04L 29/06* (2006.01)
*H04W 28/14* (2009.01)
*G06F 7/76* (2006.01)

(52) U.S. Cl.
CPC .......... *H04L 7/0008* (2013.01); *G06F 9/3869* (2013.01); *G06F 13/42* (2013.01); *H04L 65/4069* (2013.01); *G06F 7/76* (2013.01); *H04W 28/14* (2013.01)

(58) Field of Classification Search
CPC . H04L 7/0008; H04L 65/4069; G06F 9/3869; G06F 13/42; G06F 7/76
See application file for complete search history.

(56) References Cited

U.S. PATENT DOCUMENTS

| 5,315,301 | A * | 5/1994 | Hosotani | H03M 1/0643 341/156 |
| 2004/0015526 | A1* | 1/2004 | Ziegler | G01R 31/318538 708/209 |
| 2013/0102264 | A1* | 4/2013 | Nakane | H03M 1/1004 455/130 |

* cited by examiner

*Primary Examiner* — Jaison Joseph
(74) *Attorney, Agent, or Firm* — Klein, O'Neill & Singh, LLP

(57) ABSTRACT

Methods and systems for network devices are provided. One method includes receiving a serial data stream at a network interface of a network device coupled to a network link to communicate with other networked devices, the data stream including an alignment marker with a bit pattern for recovering a bit stream used by network device logic for processing the received serial data stream; using a plurality of comparators for simultaneously comparing within a single clock cycle, portions of a parallel data stream generated after converting the serial data stream by a de-serializer of the network device; detecting the bit pattern of the alignment marker in the parallel data stream by one of the plurality of comparators; storing a starting bit position of the alignment marker in the parallel data stream; and reordering the parallel data stream based on the stored starting bit position of the alignment marker.

20 Claims, 4 Drawing Sheets

METHODS AND SYSTEMS FOR DATA ALIGNMENT IN NETWORK DEVICES

TECHNICAL FIELD

The present invention relates to network devices and more particularly, for efficiently recognizing bit patterns in network traffic.

BACKGROUND

Computing systems typically use adapters and network devices for sending data to and receiving data from mass storage devices. Typically, a serial data bit stream is received by an adapter over a wire (for example, copper wire, optical cable and others) and then provided to a higher level function for processing. The serial bit stream is transformed from serial data to parallel data using a process called "de-serialization". The de-serialized data is provided to alignment logic so that other hardware components can recognize the received bit patterns. Continuous efforts are being made to efficiently detect bit patterns, especially in light of adapters operating at high speeds, for example, 64 gigabits ("G") or higher.

BRIEF DESCRIPTION OF THE DRAWINGS

The various aspects relating to securing data will now be discussed in detail with an emphasis on highlighting the advantageous features. These novel and non-obvious aspects are shown in the accompanying drawings, which are for illustrative purposes only. These drawings include the following figures, in which like numerals indicate like parts.

DETAILED DESCRIPTION

Figure 1A:
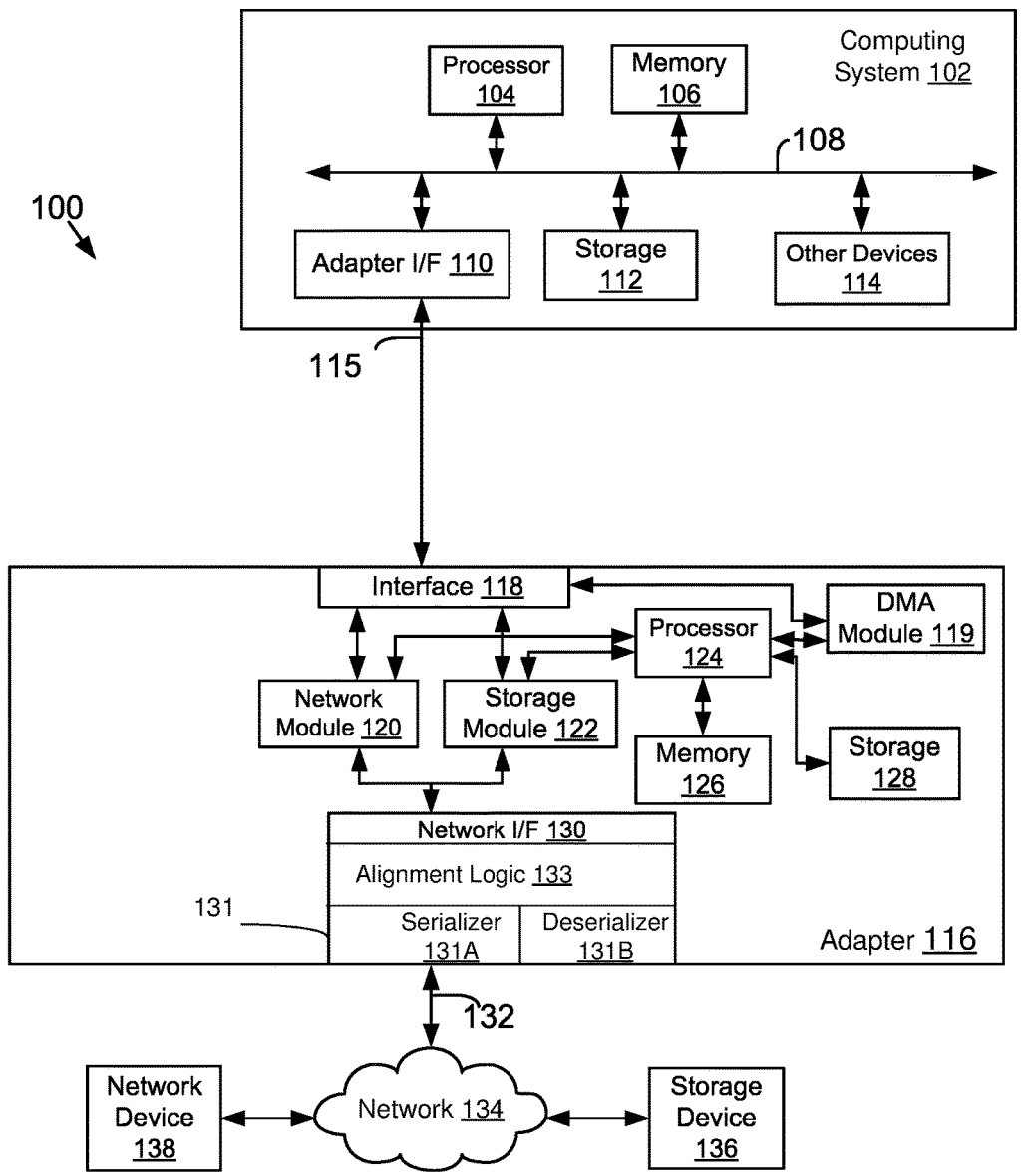
FIG. 1A is a functional block diagram of a system used, according to one aspect of the present disclosure.

The following detailed description describes the various present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices and maybe based on the various process flows described below in detail.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The various aspects disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

System 100:

FIG. 1A shows an example of a system 100 configured for use with the various aspects of the present disclosure. System 100 may include one or more computing systems 102 (may also be referred to as "host system 102") coupled to an adapter 116 via a link 115. Link 115 may be an interconnect system, for example, a PCI-Express (PCIe) link or any other interconnect type. The adapter 116 interfaces with a network 134 via one or more network links 132. The network 134 may include, for example, additional computing systems, servers, storage systems, etc.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The processor 104 executes computer-executable process steps and interfaces with an interconnect (or computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

The computing system 102 may also include other devices and interface 114, which may include a display device interface, a keyboard interface, a pointing device interface, etc. Details regarding the other devices 114 are not germane to the aspects disclosed herein.

The computing system 102 may further include a local storage device 112, which may be for example a hard disk, a CD-ROM, a non-volatile memory device (flash or memory stick) or any other mass storage device. Storage 112 may store operating system programs and data structures, application program data, and other data. Some of these files are stored on storage 112 using an installation program. For example, the processor 104 may execute computer-executable process steps of an installation program so that the processor 104 can properly execute the application program.

Memory 106 (maybe referred to as host memory 106) also interfaces with the computer bus 108 to provide the processor 104 with access to memory storage. Memory 106 may include random access main memory (RAM) or any other memory type. When executing stored computer-executable process steps from storage 112, processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

In one aspect, adapter 116 may be configured to handle both network and storage traffic. Various network and storage protocols may be used to handle network and storage traffic. Some common protocols/technologies are described below.

One common network protocol is Ethernet. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support higher data transfer rates for example, above 100 Mbps. The descriptions of the various aspects described herein are based on using Ethernet (which includes 100 Base-T and/or Gigabit Ethernet) as the network protocol. However, the adaptive aspects disclosed herein are not limited to any particular protocol, as long as the functional goals are met by an existing or new network protocol.

One common storage technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCOE) has been developed to handle both Ethernet and Fibre Channel traffic in a storage area network (SAN). This functionality enables Fibre Channel to leverage high-speed Ethernet networks while preserving the Fibre Channel protocol. The adapter 116 shown in FIG. 1A may be configured to operate as a FC adapter or a FCOE adapter. The illustrated adapter 116, however, does not limit the scope of the present aspects. The present aspects may be practiced with adapters having different configurations.

Referring back to FIG. 1A, adapter 116 communicates with host system 102 via an interface 118 and link 115. In one aspect, interface 118 may be a PCI Express interface having logic/circuitry for sending and receiving PCI-Express packets. The adapter 116 may also include a processor 124 that executes firmware instructions out of a memory 126 to control overall adapter operations. The adapter 116 may also include local storage 128, which may be for example non-volatile memory, such as flash memory, or any other device. The local storage 128 may store executable instructions and operating parameters that can be used for controlling adapter operations.

The adapter 116 includes a network module 120 for handling network traffic via a link 132. In one aspect, the network module 120 includes logic and circuitry for handling network packets, for example, Ethernet or any other type of network packets. The network module 120 may include memory buffers to temporarily store information received from other network devices 138 and transmitted to other network devices 138.

The adapter 116 may also include a storage module 122 for handling storage traffic to and from storage devices 136. The storage module 112 may further include memory buffers to temporarily store information received from the storage devices 136 and transmitted by the adapter 116 to the storage devices 136. In one aspect, the storage module 122 is configured to process storage traffic according to the Fibre Channel storage protocol, or any other protocol. It is noteworthy that adapter 116 may only have a network module 120 or a storage module 122. The various aspects described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels (not shown) for managing access to link 115. The DMA channels are typically used to move control structures such as input/output control blocks (IOCBs), input/output status blocks (IOSBs) and data between host system memory 106 and the adapter memory 126. It is noteworthy that the DMA module 119 may have a transmit side DMA segment to bring data from host memory 106 to the adapter and a receive side DMA segment to send data to the host memory 106.

In one aspect, network interface 130 receives serial data from network link 132. The serial data is received by a SERDES 131 having a serializer 131A and a de-serializer 131B. The de-serializer 131B de-serializes serial data into parallel data for processing by upper layer logic, for example, storage module 122. The parallel data is provided to alignment logic 133 to detect alignment markers. The serializer 131A serializes parallel data that is transmitted via network interface 130 to other network devices.

When network interface 130 is configured to operate, for example, at 64G, and receives data from storage device 136, then a 257-bit pattern is received in a data stream followed by 5,570, 303 bits. The bit pattern is referred to as an alignment marker. The alignment marker includes fixed constant values and some variable values. The rest of the data (i.e. 5, 570, 303 bits) includes scrambled data. The alignment marker is used to assist alignment logic 133 in recovering a bit stream to present the received data in a proper format to the storage module 122 for further processing. Once a bit pattern is determined, subsequent bit patterns occur at the same bit position. The process of identifying the known bit pattern and determining the starting bit position may be referred to as acquiring "alignment marker lock".

The alignment logic 133 has challenges for acquiring the alignment marker lock because after deserialization by the de-serializer 131B the alignment marker may occur at any location. For example, if an 80-bit, parallel data bus is used to receive the de-serialized data from de-serializer 131B, then the alignment marker may occur at bit 0, 43 or 51. Because alignment markers occur after relatively long intervals, for example, after 5,570, 303 bits of data, for efficient performance, adapter 116 has to acquire the alignment lock efficiently so that data can be processed quickly to comply with the operating speeds of the network interface 130.

Figure 2:
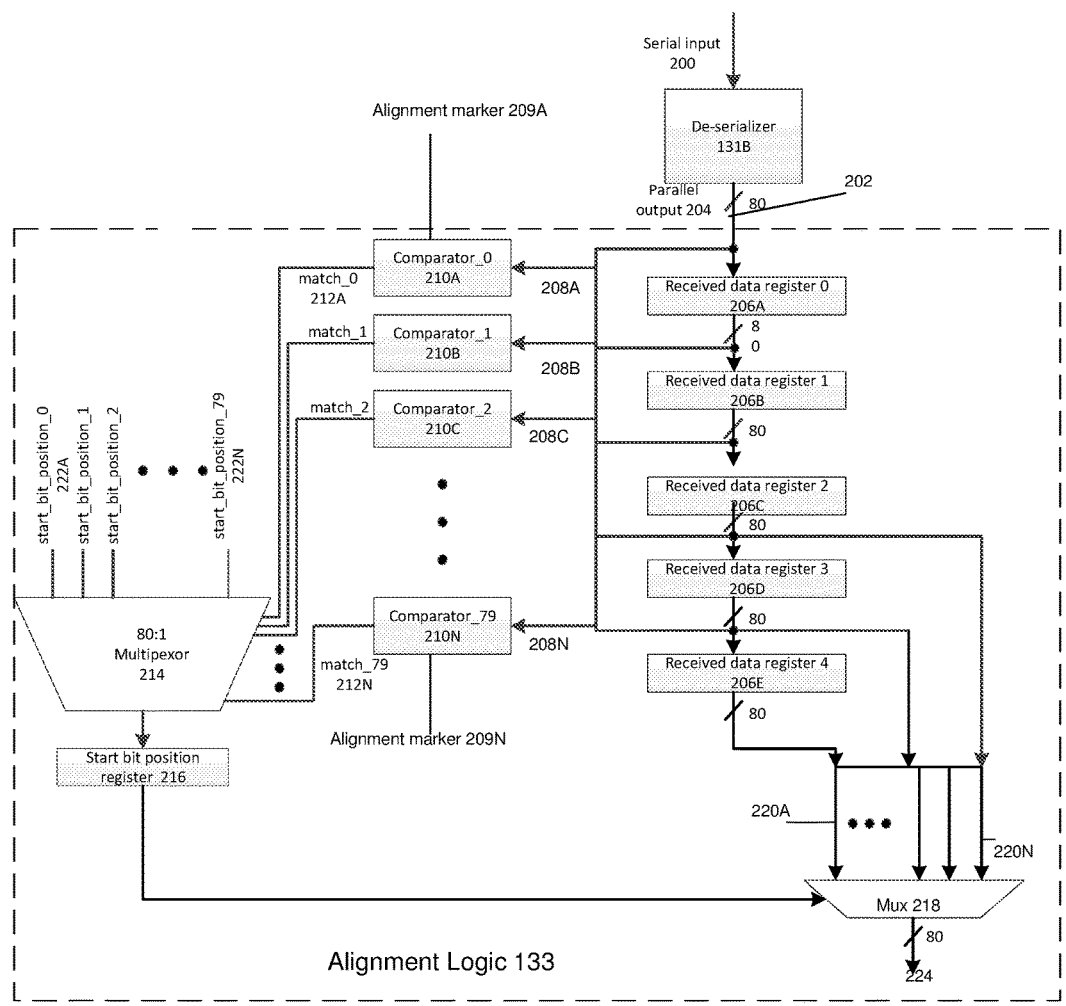
FIG. 2 shows an example of a system for detecting bit patterns in a received data stream at a network device, according to one aspect of the present disclosure.

In one aspect, the alignment logic 133 implements an alignment marker lock process by taking the parallel data from de-serializer 131B and forming a bus that is wide enough (i.e. a "wide bus") to compare against a 257-bit alignment marker. Using the wide bus, the alignment logic 131, described below in detail with respect to FIG. 2, compares all possible sections of the wide bus against an expected fixed and known portions of the alignment marker. The comparisons are conducted within a single clock cycle. When a match is found, the starting bit position is stored, for example, at a register. The bit position is used to select the appropriate section of the wide bus in order to provide correct data to upper layers for processing the received data. Before describing the details of alignment logic 133, the following provides a description of the software architecture used by system 100.

Figure 1B:
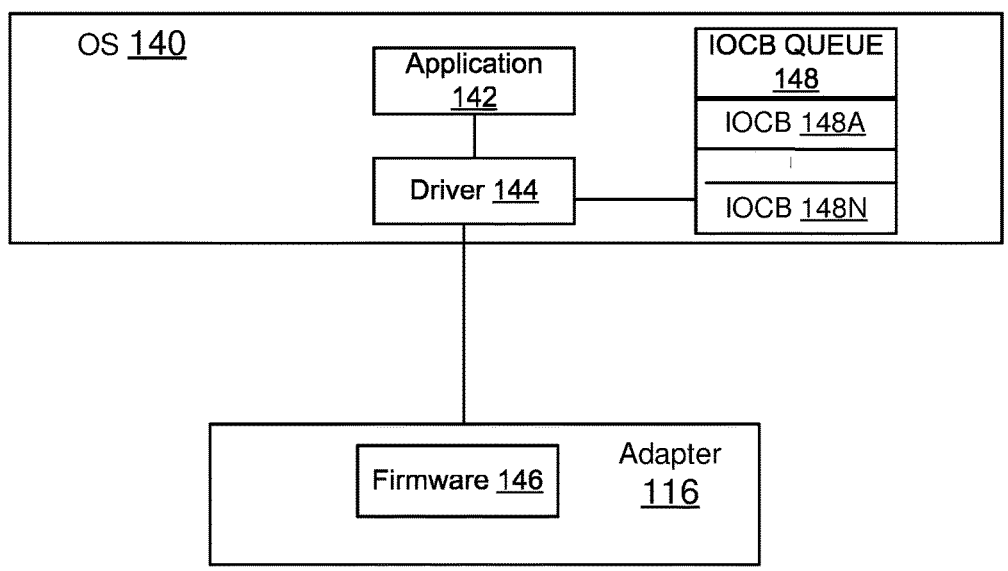
FIG. 1B shows a block diagram of a generic software architecture used by the system of FIG. 1A.

Software Architecture:

FIG. 1B shows an example of a generic software architecture used by the various components of system 100. Processor 104 of the host system 102 executes an operating system 140 for controlling the overall operations of host computing system 102. The operating system may be Windows based, Linux operating system, Solaris, or any other operating system type (without derogation of any third party trademark rights). The aspects disclosed herein are not limited to any particular operating system type.

An application 142 may be executed by processor 104 for performing certain functions. For example, application 142 may be an email program, a database application or any other application type. Application 142 may send a command to a host driver 144 for performing an operation, for example, reading and/or writing data (input/output (I/O) at another storage device. The driver 144 processes the request and communicates with firmware 146 executed by processor 124 of adapter 116. One or more components of adapter 116 then process the request.

Typically for managing data transfers across link 115 an IOCB (Input Output Control Block) is first generated by the driver 144 and saved at an IOCB queue 148, shown as 148A-148N. The IOCB queue 148 may be at host memory 106 or any other location. The IOCB is obtained by adapter 116 which may be to provide data to host processor 104 or to send data provided by host processor 104. Both IOCB fetch and data transfer operations are performed using DMA operations via DMA channels (not shown). Based on the IOCB, adapter 116 executes the operations that may be needed. Adapter 116 then uses DMA operation to send a status block (IOSB) to processor 104 indicating the completion of IOCB execution and associated data transfer.

Alignment Logic 133:

FIG. 2 shows a block diagram of alignment logic 133, according to one aspect of the present disclosure. In one aspect, a data stream, shown as serial input 200, is received by de-serializer 131B of SERDES 131. The de-serializer 131B converts the serial input 200 into parallel data and provides parallel output 204. As an example, the parallel output 204 is sent via an 80-bit bus 202. It is noteworthy that the 80-bit bus is shown as an example and any other bus size maybe used to generate the parallel output 204.

The data stream from the de-serializer 131B is provided to a register bank with a plurality of registers 206A-206E. Each register is able to store 80-bits or (X bits) of data. As data is streamed downwards, and placed at registers 206A-206E, 255 bits of data are fed simultaneously to a plurality of comparators 210A-210N. Each comparator is provided or has access to the alignment marker bit values (shown as 209A-209N) and within a single clock cycle, the comparators compare 209A-209N with data 208A-208N to detect the alignment marker in the parallel output 204.

When there is a match from one of the comparators (shown as 212A-212N), a match signal from among 212A-212N is provided to a multiplexor 214. In one aspect, the multiplexor may be 80:1 to match the 80-bit wide output from the de-serializer 131B. The start bit position of the alignment marker (shown as 222A-222N) is selected by Mux 214 and then stored at a start bit position register 216. The start bit position is also provided to Mux 218 that receives the data stream from the registers 206A-206E. The data stream is shown as 220A-220N.

Based on the start bit position stored at register 216, the data stream 220A-220N is reordered and the reordered data 224 is then provided to upper layer logic for further processing. In one aspect, the reordered data 224 is provided to receive logic of the storage module 122 for further processing.

Figure 3:
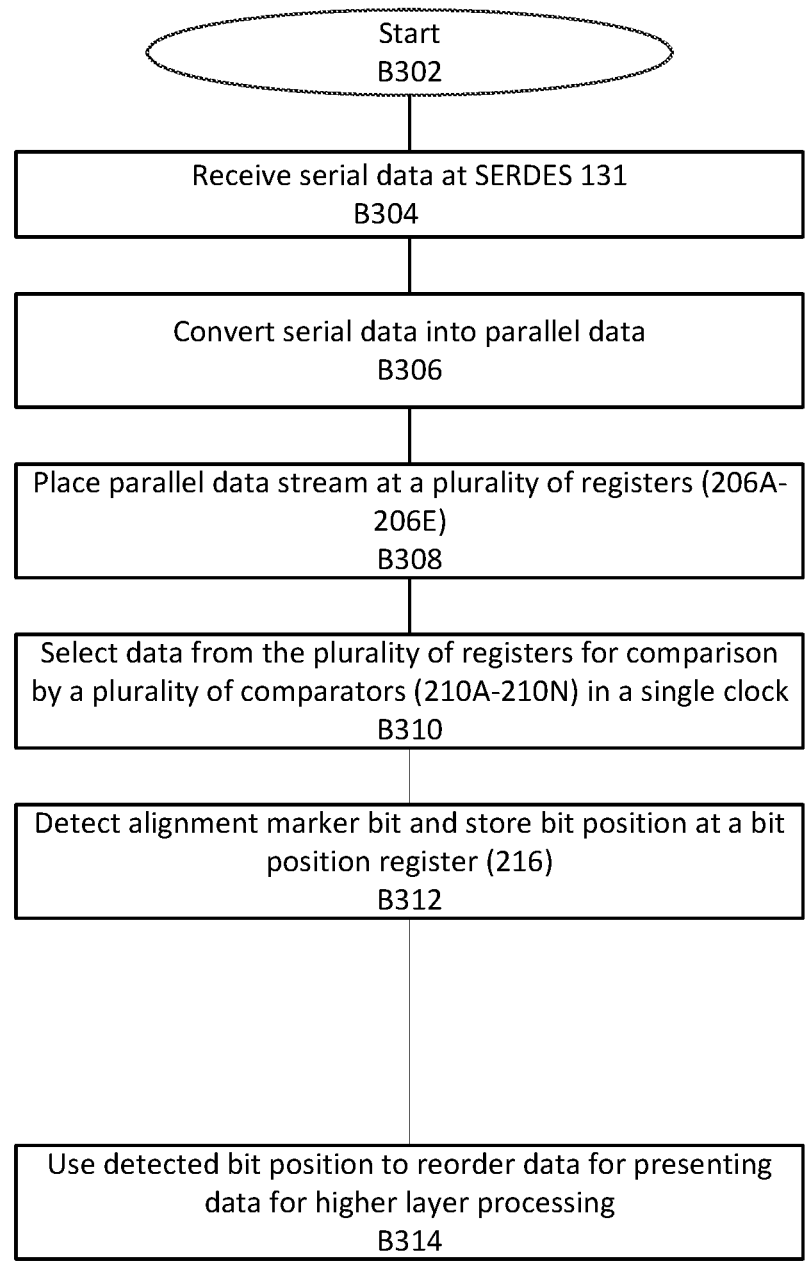
FIG. 3 shows a process flow for using the system of FIG. 2, according to one aspect of the present disclosure.

Process Flow:

FIG. 3 shows a process 300 for using the innovative, alignment logic 133 for detecting an alignment marker by comparing parallel output 204 or a portion thereof within the same clock cycle. Once the starting bit position of the alignment marker is known, the parallel output 204 can be reordered and provided to upper layer logic, according to one aspect of the present disclosure.

The process begins in block B302, when data is received by adapter 116 via link 132. In one aspect, the data stream from link 132 is a serial data stream (e.g. serial input 200, FIG. 2) complying with the Fibre Channel standards and includes an alignment marker. The serial input 200 is received by the de-serializer 131B in block B304. In block B306, the serial data is converted into parallel data 204 by the de-serializer 131B.

In block B308, the parallel data 204 is placed at registers 206A-206E. Initially, the first set of data is placed at register 206A, and as more data comes in, register 206A gets full and the data is moved further downstream to registers 206B-206E. It is noteworthy that the adaptive aspects disclosed herein are not limited to 5 registers and any number of registers maybe used to implement the processes and logic described herein.

In block B310, data 208A-208N stored at various registers 206A-206E is selected for comparison to detect the alignment marker. Within a single clock cycle, the comparators 210A-210N compare data 208A-208N with 209A-209N to detect the alignment marker bit pattern.

Once a match is detected, in block B312, the alignment marker starting bit is selected by Mux 214 and stored at register 216. Thereafter, in block B314, the detected bit position is used to reorder the parallel data stream 220A-220N at Mux 218. The reordered data is then output as 224 for upper layer processing.

In one aspect, the processes and logic described above perform alignment marker detection in a single clock cycle. This enables the alignment logic 133 to efficiently reorder data for processing by other logic of adapter 116.

In one aspect, methods and systems for network devices are provided. One method includes receiving a serial data stream (e.g. serial input 200, FIG. 2) at a network interface (e.g network interface 130, FIG. 1A) of a network device (e.g. an adapter 116, FIG. 1A) coupled to a network link (e.g. 132, FIG. 1A) to communicate with other networked devices (for example, 136, 138), the data stream including an alignment marker with a bit pattern for recovering a bit stream used by network device logic (e.g., storage module 122) for processing the received serial data stream; using a plurality of comparators (e.g. 210A-210N, FIG. 2) for simultaneously comparing within a single clock cycle, portions of a parallel data stream (208A-208N) generated after converting the serial data stream by a de-serializer (131B, FIG. 2) of the network device; detecting the bit pattern of the alignment marker in the parallel data stream by one of the plurality of comparators; storing a starting bit position (222A-222N, FIG. 2) of the alignment marker in the parallel data stream; and reordering the parallel data stream based on the stored starting bit position of the alignment marker.

In another aspect, a non-transitory machine readable storage medium having stored thereon instructions for performing a method comprising machine executable code is provided. The code when executed by at least one machine, causes the machine to: receive a serial data stream at a network interface of a network device coupled to a network link to communicate with other networked devices, the data stream including an alignment marker with a bit pattern for recovering a bit stream used by network device logic for processing the received serial data stream; use a plurality of comparators for simultaneously comparing within a single clock cycle, portions of a parallel data stream generated after converting the serial data stream by a de-serializer of the network device; detect the bit pattern of the alignment marker in the parallel data stream by one of the plurality of comparators; store a starting bit position of the alignment marker in the parallel data stream; and reorder the parallel data stream based on the stored starting bit position of the alignment marker.

In yet another aspect, a system comprising a processor executing instructions out of a memory and interfacing with a network device is provided. The network device is configured to: receive a serial data stream at a network interface of the network device coupled to a network link to communicate with other networked devices, the data stream including an alignment marker with a bit pattern for recovering a bit stream used by network device logic for processing the received serial data stream; use a plurality of comparators for simultaneously comparing within a single clock cycle, portions of a parallel data stream generated after converting the serial data stream by a de-serializer of the network device; detect the bit pattern of the alignment marker in the parallel data stream by one of the plurality of comparators; store a starting bit position of the alignment marker in the parallel data stream; and reorder the parallel data stream based on the stored starting bit position of the alignment marker.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any particular adapter type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A machine implemented method, comprising:
receiving a serial data stream at a network interface of a network device coupled to a network link to communicate with other networked devices, the data stream including an alignment marker with a bit pattern for recovering a bit stream used by network device logic for processing the received serial data stream;
using a plurality of comparators for simultaneously comparing within a single clock cycle, portions of a parallel data stream generated after converting the serial data stream by a de-serializer of the network device;
detecting the bit pattern of the alignment marker in the parallel data stream by one of the plurality of comparators;
storing a starting bit position of the alignment marker in the parallel data stream; and
reordering the parallel data stream based on the stored starting bit position of the alignment marker.

2. The method of claim 1, wherein the starting bit position is stored at a register.

3. The method of claim 1, wherein the parallel data stream is stored temporarily placed at a plurality of registers and portions of the parallel data stream are provided to the plurality of comparators for comparison using a bus.

4. The method of claim 1, wherein a multiplexor is used to reorder the parallel data stream after retrieving the starting bit position.

5. The method of claim 1, wherein each of the plurality of comparators are provided with a fixed bit pattern for detecting the bit pattern of the alignment marker.

6. The method of claim 1, wherein the align marker is 257 bits when the serial data stream is a Fibre Channel data stream from a storage device.

7. The method of claim 1, wherein the network device is a network interface device coupled to a computing device for receiving and sending data.

8. A non-transitory machine readable storage medium having stored thereon instructions for performing a method, comprising machine executable code which when executed by at least one machine, causes the machine to:
receive a serial data stream at a network interface of a network device coupled to a network link to communicate with other networked devices, the data stream including an alignment marker with a bit pattern for recovering a bit stream used by network device logic for processing the received serial data stream;
use a plurality of comparators for simultaneously comparing within a single clock cycle, portions of a parallel data stream generated after converting the serial data stream by a de-serializer of the network device;
detect the bit pattern of the alignment marker in the parallel data stream by one of the plurality of comparators;
store a starting bit position of the alignment marker in the parallel data stream; and
reorder the parallel data stream based on the stored starting bit position of the alignment marker.

9. The non-transitory machine readable storage medium of claim 8, wherein the starting bit position is stored at a register.

10. The non-transitory machine readable storage medium of claim 8, wherein the parallel data stream is stored temporarily placed at a plurality of registers and portions of the parallel data stream are provided to the plurality of comparators for comparison using a bus.

11. The non-transitory machine readable storage medium of claim 8, wherein a multiplexor is used to reorder the parallel data stream after retrieving the starting bit position.

12. The non-transitory machine readable storage medium of claim 8, wherein each of the plurality of comparators are provided with a fixed bit pattern for detecting the bit pattern of the alignment marker.

13. The non-transitory machine readable storage medium of claim 8, wherein the align marker is 257 bits when the serial data stream is a Fibre Channel data stream from a storage device.

14. The non-transitory machine readable storage medium of claim 8, wherein the network device is a network interface device coupled to a computing device for receiving and sending data.

15. A system comprising:
a processor executing instructions out of a memory and interfacing with a network device, wherein the network device is configured to:
receive a serial data stream at a network interface of the network device coupled to a network link to communicate with other networked devices, the data stream including an alignment marker with a bit pattern for recovering a bit stream used by network device logic for processing the received serial data stream;
use a plurality of comparators for simultaneously comparing within a single clock cycle, portions of a parallel data stream generated after converting the serial data stream by a de-serializer of the network device;
detect the bit pattern of the alignment marker in the parallel data stream by one of the plurality of comparators;
store a starting bit position of the alignment marker in the parallel data stream; and
reorder the parallel data stream based on the stored starting bit position of the alignment marker.

16. The system of claim 15, wherein the starting bit position is stored at a register.

17. The system of claim 15, wherein the parallel data stream is stored temporarily placed at a plurality of registers and portions of the parallel data stream are provided to the plurality of comparators for comparison using a bus.

18. The system of claim 15, wherein a multiplexor is used to reorder the parallel data stream after retrieving the starting bit position.

19. The system of claim 15, wherein each of the plurality of comparators are provided with a fixed bit pattern for detecting the bit pattern of the alignment marker.

20. The system of claim 15, wherein the align marker is 257 bits when the serial data stream is a Fibre Channel data stream from a storage device.

* * * * *